(No Model.) 2 Sheets—Sheet 2.

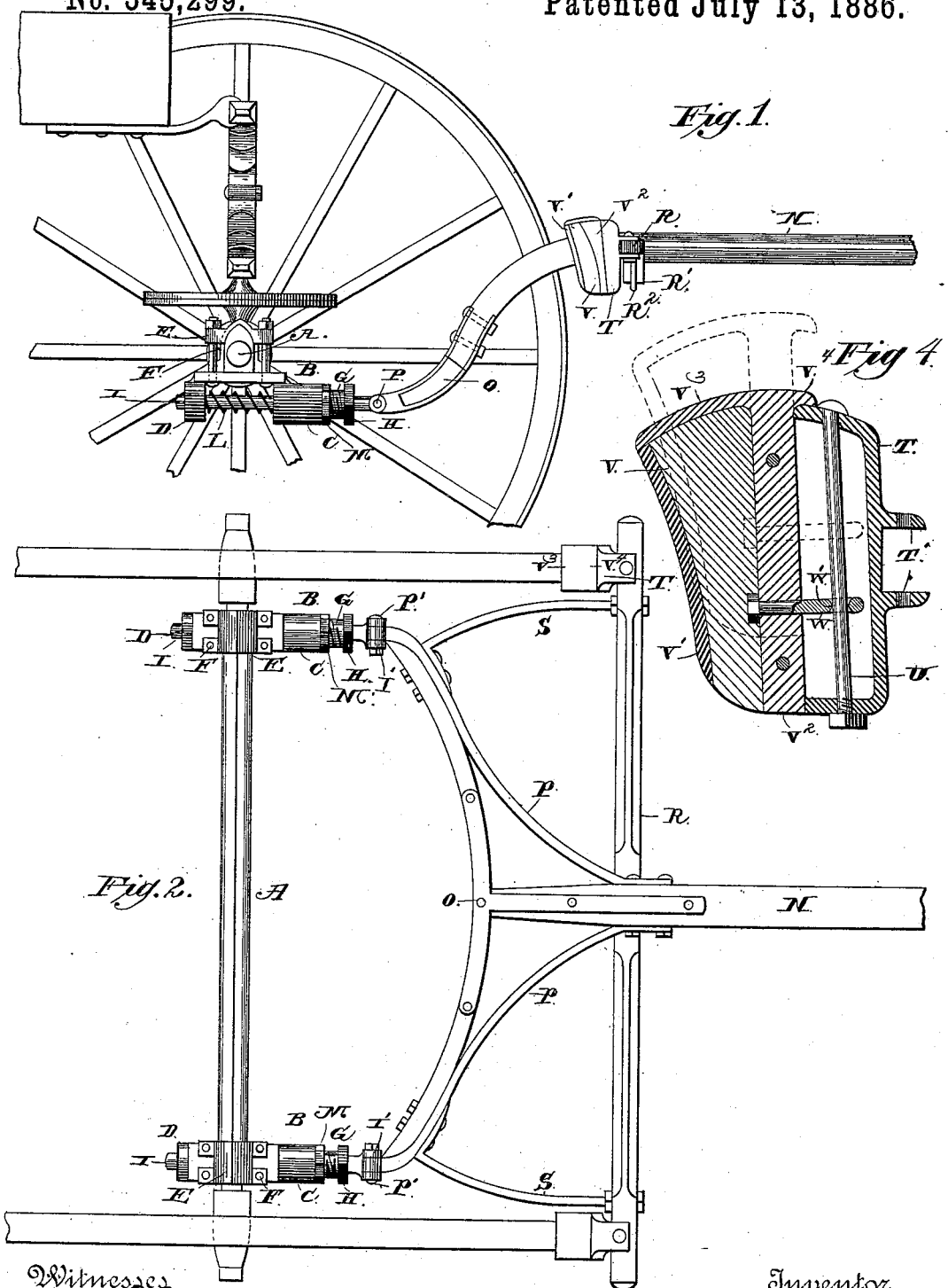

P. R. GOTTSTEIN & G. P. McFARLANE.
VEHICLE BRAKE.

No. 345,299. Patented July 13, 1886.

Witnesses
M. E. Fowler
J. W. Garner

Inventor
P. R. Gottstein and
G. P. McFarlane
By their Attorneys

UNITED STATES PATENT OFFICE.

PETER R. GOTTSTEIN AND GEORGE PARLAN McFARLANE, OF HOUGHTON, MICHIGAN; SAID McFARLANE ASSIGNOR OF ONE-HALF OF HIS RIGHT TO SAID GOTTSTEIN.

VEHICLE-BRAKE.

SPECIFICATION forming part of Letters Patent No. 345,299, dated July 13, 1886.

Application filed November 3, 1885. Serial No. 181,773. (No model.)

*To all whom it may concern:*

Be it known that we, PETER R. GOTTSTEIN and GEORGE PARLAN McFARLANE, citizens of the United States, residing at Houghton, in the county of Houghton and State of Michigan, have invented a new and useful Improvement in Brakes for Vehicles, of which the following is a specification, reference being had to the accompanying drawings.

This invention relates to an improvement in brakes for vehicles; and it consists in the peculiar construction and combination of devices, that will be hereinafter more fully set forth, and particularly pointed out in the claims.

Figure 3:
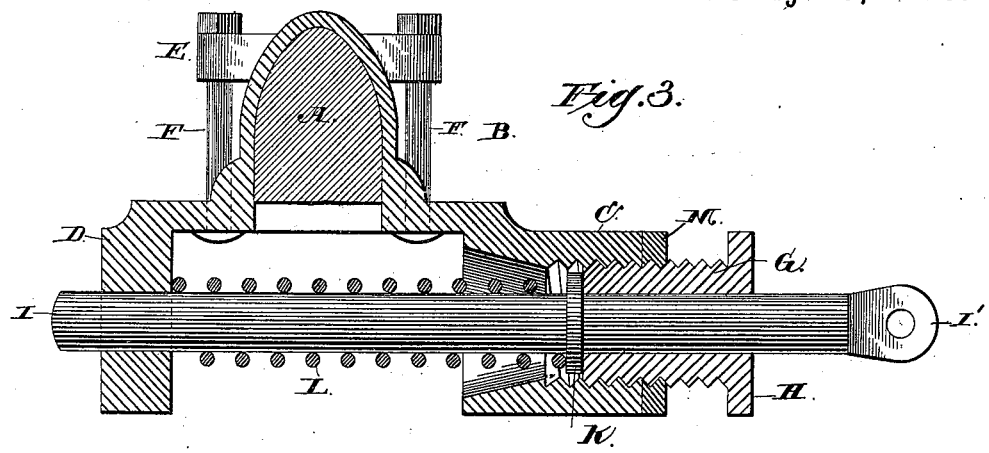
Figure 5:
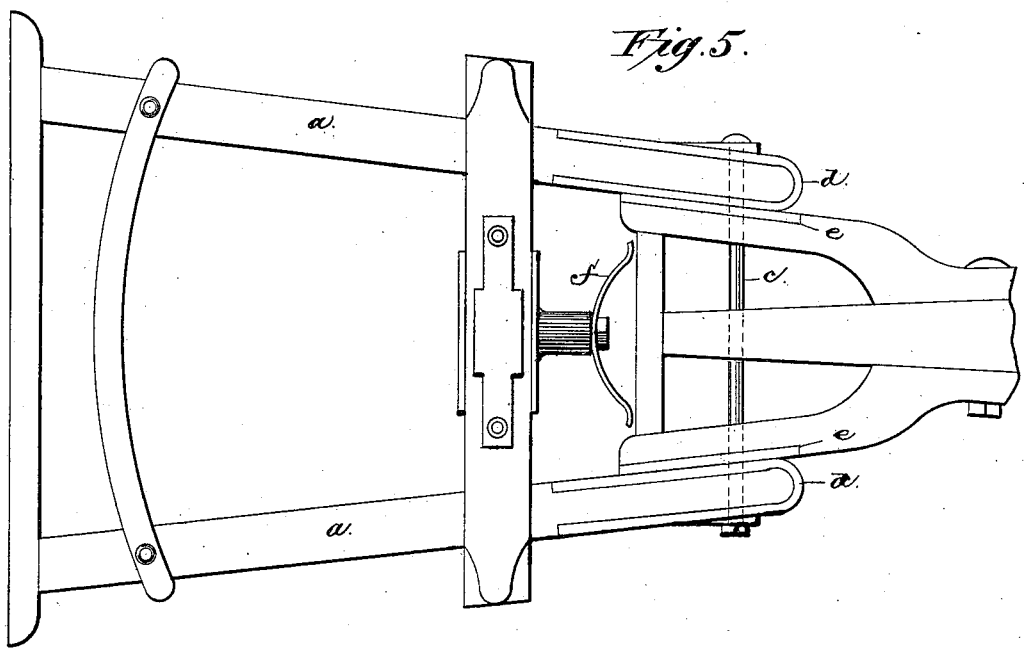
Figure 6:
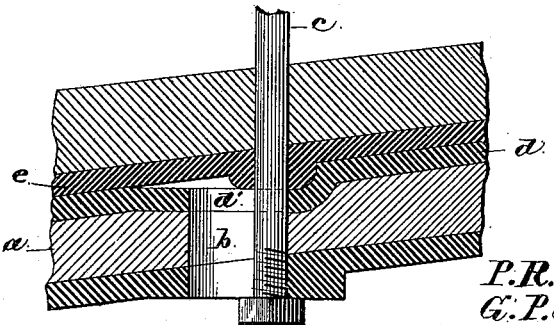

In the accompanying drawings, Figure 1 is a side elevation of our invention applied to the front axle of a vehicle. Fig. 2 is a top plan view of the same. Fig. 3 is a detail vertical longitudinal section of the coupling for securing the tongue or thills to the axle. Fig. 4 is a detail vertical sectional view showing the construction of the vertical removable brake block or shoe. Fig. 5 is a top plan view of a modified form of our invention. Fig. 6 is a detail sectional view of a portion of the same.

A represents the front axle of the carriage or other vehicle, to which is secured a pair of couplings, B, each of which has on its front side an interiorly-screw-threaded projection, C, and on its rear side a downwardly-extending lug, D. These couplings are secured to the axle by means of yokes E and bolts F, similar to the ordinary clips.

G represents exteriorly-screw-threaded sleeves, that are screwed into the projections C of the couplings, and have enlarged heads H. These sleeves are provided with longitudinal central openings, through which and through aligned openings in the studs D pass longitudinally-movable bolts I, the shanks of which, at a suitable distance from their front ends, are provided with collars K, that bear against the inner ends of the sleeves E, to limit the forward movement of the bolts. On the rear ends of these bolts, and bearing between the studs D and the collars K, are placed coiled extensile springs L, which serve to keep the collars K of the bolts I normally bearing against the inner ends of the sleeves E. By turning the latter so as to move them in or out in the threaded openings of the projections C the play or movement of the bolts I may be limited at will, as will be very readily understood.

M represents clamping-nuts, which work on the projecting ends of the sleeves E and bind against the outer ends of the projections C, to prevent movement of the sleeves. The outer ends of the bolts I are provided with eyes I'.

N represents a tongue or draft-pole, to the rear end of which is secured a curved yoke, O. This yoke has its ends connected and braced to the tongue by means of iron rods P, the rear ends of which extend beyond the yoke and form draft-irons, that are coupled to the eyes I' by means of bolts P', in the usual way.

R represents a brake-beam, which is secured transversely to the tongue near the rear end of the latter, and is braced on its under side by means of a bridge-rod, R', and a bolster or bearing-block, R², in order to strengthen the brake-beam; but the said block and bar may be dispensed with, if preferred. Near the outer ends of the brake-beam are secured curved iron rods S, the rear ends of which are bolted to the outer ends of the yoke and serve to brace the outer ends of the brake-beam firmly.

T represents metallic blocks or castings, which are hollowed on their rear sides, and are bolted to the outer ends of the brake-beam in line with and in front of the rims of the front wheels. These blocks T have on their front sides flanges or lugs T', which bear on the upper and lower sides of the brake-beam, to support the blocks T in a vertical position thereon, and prevent the said blocks from turning on the brake-beam. Through the center of each of the blocks passes a vertical bolt, U, having a nut screwed on its lower end, so as to keep the bolt firmly clamped to the block.

V represents the brake-shoes, which are substantially wedge-shaped and have the points extending downwardly. These shoes are preferably made of wood or other yielding material, and are sheathed with iron or steel, as at V', on their wearing-edges, where they come in contact with the wheel. Recessed in the center of the front sides of the brake-shoes are metallic plates V², the upper ends of which have laterally-extending flanges V³ and V⁴, which bear upon the upper sides of the brake-shoes and the blocks T, respectively.

W represents bolts or screws, that are secured to the brake-shoes and project from the front sides thereof, and in the outer ends of these bolts are made openings W', through which pass the bolts U, whereby the brake-shoes are permitted to slide vertically on the rear sides of the blocks T.

The tension of the springs L is such as to keep the tongue normally at the forward limit of its movement, with the brake-shoes disengaged from and out of contact with the peripheries of the front wheels. When the vehicle is descending a hill or incline, its gravity overcomes the resistance of the springs L, and as the horses hold back upon the tongue the brakes are applied to the front wheels automatically and without any exertion on the part of the driver.

If the brake-shoes were immovably secured to the brake-beam, the vehicle could not be backed, as the brakes would be applied to the front wheels and offer excessive friction or resistance to their movement. In order to overcome this objection we have secured the brake-shoes to the brake-beam so that they may move vertically thereon. In backing the vehicle, as soon as the brake-shoes touch the rims of the wheels, the reverse movement of the said wheels causes the brake-shoes to rise, and thus prevents them from offering appreciable resistance to the rotation of the wheels, and enables the team to readily back the vehicle.

In Fig. 5 we illustrate a modified form of our invention, which is preferably used for heavy wagons, in which $a$ represents the hounds, which are secured to the front axle in the usual way. Near the outer ends of the hounds are aligned horizontal transverse slotted openings $b$, through which passes the queen-bolt $c$, which secures the rear end of the tongue in between the hounds and pivots the said tongue thereto. The slotted openings permit the tongue to be moved back and forth in the hounds for a suitable distance in order to apply and release the brakes. In order to confine the tongue to an exact longitudinal movement, we recess the inner sides of the converging hounds in line with the slotted openings thereof, the faces of said recesses being exactly parallel to the longitudinal axis of the hounds. $d$ represents angle wear-plates which are secured in said recesses, and $e$ represents wear-plates which have bosses or projections on their outer sides at an angle corresponding to the angle of the plates $b$, and which work against said plates. The queen-bolt passes also through the plates $d$ and $e$, the former of which has slotted openings $d'$, corresponding to the openings in the hounds, which permit the horizontal movement of the said queen-bolt. $f$ represents a semi-elliptic spring, which is secured centrally to the stud that projects from the cross-bar on the hounds, and the ends of this spring bear against the rear end of the tongue.

We are aware that a vertically-movable brake-shoe is not broadly new; but heretofore the means which serve to connect the brake-shoe to the thills moved with the shoe, inasmuch as the latter was hinged to the thills. In our construction the brake-shoe is rigidly fastened to the thills by the blocks T, which, being provided with the rigidly-fastened bolts, allows the vertical movement of the shoes without affecting the said fastening means. We are also aware that longitudinally-movable thills or brake-bars are not broadly new; also, that a thill-coupling has been provided with a spring, so that the latter would yield when the thills were drawn upon, and thus ease the draft; but we are not aware that an automatic brake has been provided combining longitudinally-movable thills with means (as, for instance, the coiled springs shown) to keep the thills extended so as to retain the brake-shoes off the wheels. This is what we claim as original with us.

Having described our invention, we claim—

1. The combination, in a brake for a vehicle, of the horizontally-movable pivoted tongue or thills, the brakes secured to said tongue or thills forward of the pivot, for bearing automatically on the front wheels, and the means, such as a spring, for keeping the tongue or thills projected forward, so as to retain the brakes normally disengaged from the wheels, the said means being overcome substantially as described.

2. In a brake for vehicles, the combination of the couplings, the horizontally-movable bolts I therein for the attachment of the tongue or thills to which the brakes are secured, the springs L, bearing against the said bolts, and the movable sleeves G, for limiting the play or movement of the bolts, substantially as described.

3. In a brake for vehicles, the combination of the couplings B, having threaded projections C and the lugs D, the horizontally-movable bolts I, having their rear ends passed through openings in the studs D, the said bolts having stops or collars K, the sleeves G, screwed into the projections C and bearing against the front sides of the collars or stops, for limiting the movement of the bolts, and the bearing-springs L, for keeping the bolts normally at the forward limit of their movement, substantially as described.

4. The combination of the brake-beam, plates T, secured thereto, and having the flanges T' bearing on opposite sides of the beam, and the brake-shoes secured to the rear sides of the blocks T and vertically movable thereon, substantially as described.

5. The combination of the brake-beam, the hollow blocks T, secured thereto, the vertical bolts U, secured in said blocks, and the brake-shoes on the rear side of the blocks T, and secured to the bolts U and vertically movable thereon, substantially as described.

6. The combination of the brake-beam, the hollow blocks T, secured thereto, and having the vertical bolts U, and the vertical movable brake-shoes on the rear side of the said blocks, and the eyebolts working on the bolts U and secured to the brake-shoes, substantially as described.

7. The combination of the brake-beams, blocks T, secured thereto, the vertically-movable brake-shoes secured to the said blocks, said brake-shoes having the plates $V^2$ on their front sides, which are provided with flanges $V^3$, bearing on the upper sides of the brake-shoes, and flanges $V^4$, bearing on the upper sides of the blocks T, substantially as described.

8. The combination, with the horizontally-movable pivoted thills or tongues, of the vertically-movable brake-shoes connected to the thills or tongues forward of the pivotal point thereof, and the springs or other suitable means arranged in rear of the shoes to keep the thills extended so as to retain the brake-shoes off the wheels, as set forth.

In testimony that we claim the foregoing as our own we have hereto affixed our signatures in presence of two witnesses.

PETER R. GOTTSTEIN.
GEORGE PARLAN McFARLANE.

Witnesses:
J. H. RICE,
J. L. REES.